Patented Oct. 17, 1922.

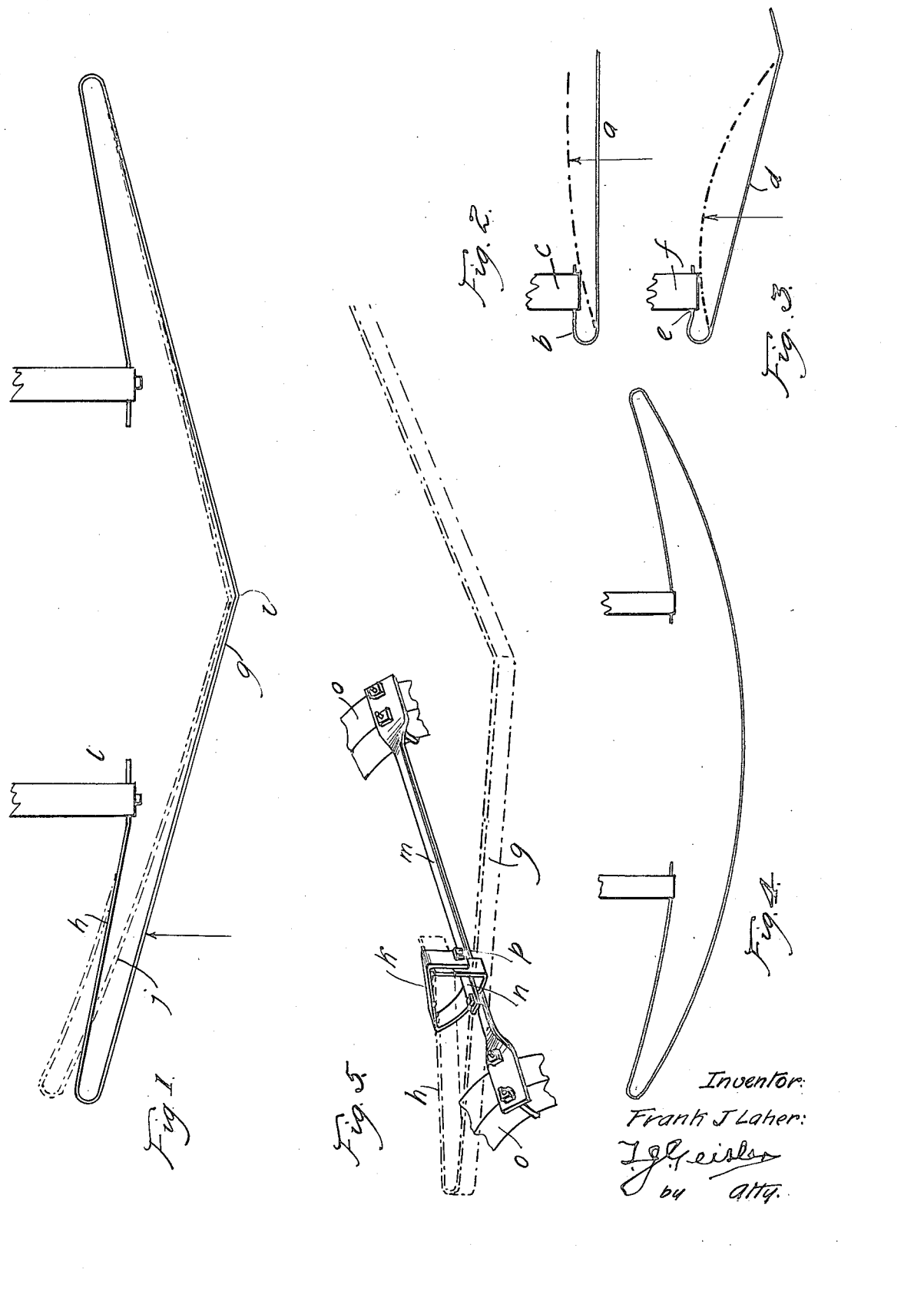

1,432,602

UNITED STATES PATENT OFFICE.

FRANK J. LAHER, OF SEATTLE, WASHINGTON.

BUMPER FOR VEHICLES.

Application filed December 22, 1920. Serial No. 432,577.

*To all whom it may concern:*

Be it known that I, FRANK J. LAHER, a citizen of the United States, and a resident of the city of Seattle, county of King, and State of Washington, have invented a certain new and useful Improvement in Bumpers for Vehicles, of which the following is a specification.

The object of my invention is to provide a vehicle with a fender or bumper so constructed as to have a tendency to brush the body struck to one side, relatively, and so minimize the impact, as in a collision between two vehicles, or to throw the person struck out of the path of the vehicle, and thus preventing the vehicle running over the person knocked down.

I attain my object in a bumper constructed of a flat resilient bar bent to an arc, or, preferably, to an obtuse angle in a plane parallel with the ground; the ends of the bar having a return bend end, extending thence alongside of the respective adjacent sides or ends of the bar; the bumper being supported by its extremities by supports affixed to the hounds of the chassis of the vehicle, the point of support being located close to, and equi-distant from, the middle of the bumper as diagrammatically illustrated in Fig. 1. The working of my bumper, in case of collision, may be contrasted with other types of bumpers by having reference to the diagrammatic illustrations shown in Figs. 2 and 3.

Fig. 4 shows a variation of my bumper, which in this instance is shown arched; and Fig. 5 illustrates means for supporting the extremities of my bumper, so as to locate the points of support close to the middle of the bumper, in order that its face ends will have greater elasticity, and be readily deflected in response to impact with another object.

Referring again to Fig. 2; this shows for contrast a well known type of bumper consisting of a flat bar $a$ supported near its ends as at $b$ on some convenient part ($c$) of the hounds or frame of the running gear of the vehicles, as at $c$. If an object is struck by this type of bumper, though near one end of it, the deflection would be inward as indicated by the dash-and-dot line in this figure, and thus this type of bumper would have a tendency to throw the object struck directly in front of the vehicle.

Referring now to Fig. 3: This represents a type of bumper bar $d$ bent to an obtuse angle, thus having some of the characteristics of my invention, but not all, namely; the bar $d$ is supported at its ends, as at $e$, on some convenient part of the running gear of the vehicle, as at $f$. If a bumper of this type were to strike an object there would be tendency for the end of the bumper struck to bow in-ward, and thus throw the object struck more or less straight ahead. Such results in either the latter examples is due to the improper location of the points of support of the bumper bar.

Referring now to the illustration of my invention, embodying all features, as shown in Fig. 1. The ends of the bumper bar $g$ are inclined at an obtuse angle to each other, the ends extending thence alongside of the adjacent ends of the bumper bar. The extremities of said ends are supported by any suitable means as at $l$ on the hounds of the vehicle, such means being located close to the vertex $i$ of the angle which the sides of ends of the bumper make with each other. When so arranged, if either end of my bumper strikes an object there would be a tendency of such side being deflected, as indicated by the broken line $j$ in Fig. 1, which deflection would have a tendency to brush the body struck to one side, and thus out of the path of the vehicle; and in the case of two vehicles colliding the impact would become a glancing blow.

The extremities of my bumper-bar may be supported by devices as shown in Fig. 5 consisting of brackets as $k$ made of a bar bent to angular form, the ends thereof overlapping one the other, and the base of the bracket having an arcuate section. As shown in the drawings the latter section of each of the brackets is supported on a bar $m$, by means of clamps $n$, the bar $m$ being supported on the hounds $o$. The ends of the brackets $k$ are perforated to receive bolts $p$, by which the parts are firmly clamped together. These particular bumper-supporting brackets are more fully described in my accompanying application for patent "Means for supporting bumper on auto chassis" filed Dec. 22, 1920, Serial No. 423578.

The construction and arrangement of the devices illustrated in Fig. 5 for supporting the extremities of my bumper is to provide a means for mounting my bumper on the hounds or side-bars of the running gear of any type of vehicle, and at the same time locating the points of support of the extremities of my bumper close to the middle of the latter, in order to give the ends of my bumper ample elasticity, and cause them to readily yield, and become deflected so as to relatively throw the object struck to one side of the vehicle. To a certain extent a good result is obtained from an arched bumper such as shown in Fig. 3, where the points of support of the extremeties of the bumper are located close to the middle of the latter; but the angular construction illustrated in Fig. 1 is to be preferred, because in the latter construction impact at the apex or middle of the bumper would cause a column action in resistance, and impact at any point located a substantial distance to one side of the middle of the bumper, would cause that end of the bumper not subjected to the impact to have a truss like resistance with respect to the ends subjected to the impact, and cause the latter end to yield and to become deflected, and in so doing having a tendency to cause the desired action, namely: the throwing of the object struck to one side, or to convert the impact into a glancing blow. The degree to which such effect is obtained of course depends upon the distance the point of impact is located from the vertex of the angle which the two sides or ends of the bumper make with each other.

I claim:

1. A bumper comprising connected inpact sections arranged in two divergent planes, supporting sections integral with the outer ends of the impact sections and adapted to be rigidly supported at their inner ends, the length of the supporting sections relative to the length of the impact sections causing either supporting section to move bodily on impact on the connected impact section, the supporting section moving about its rigidly supported end as a fulcrum whereby to permit the impact section to yield bodily and without plane distortion to increase the normal divergence of such impact sections.

2. A bumper comprising an impact section arranged in planes divergent from a central portion of such section, and supporting members integral with the respective outer ends of the impact section and of such length as to form fulcrum sections capable of transferring an impact force on said impact section to the adjacent outer end of such section, whereby the impact section yields bodily and without distortion under impact.

3. A bumper having impact sections diverging rearwardly, and supporting sections connected to the ends of the impact sections and normally substantially parallel thereto, said supporting section being adapted to be supported at their inner ends, the length of the supporting sections relative to the length of the impact sections causing said supporting section to move with the impact sections and transfer the force to the end of such impact sections, to thereby cause bodily movement of outer impact section on impact thereon to increase the divergence between the impact sections without permitting distortion of such bodily moved impact section.

4. A vehicle bumper formed of resilient metal and bent centrally to form oppositely diverging outwardly and rearwardly extending portions, each rebent at its outer end to provide inwardly extending portions which lie substantially in the plane of the diverging portions and terminating at points near the center of the bumper, whereby to provide on each end of the bumper a resilient zone which when an impact occurs in one zone same will yield and impart to the object struck a glancing blow and throw such object away from the center of the bumper.

FRANK J. LAHER.